United States Patent [19]

Sherman et al.

[11] Patent Number: 5,002,660
[45] Date of Patent: Mar. 26, 1991

[54] COMPACT AQUARIUM FILTER

[75] Inventors: Robert Sherman, Bell Canyon; Robert F. Reinoehl; Charles O. Fuerst, both of Simi Valley; Leonard Pitts, Valencia; John Fisher, Malibu, all of Calif.

[73] Assignee: Aquaria, Inc., Simi Valley, Calif.

[21] Appl. No.: 203,671

[22] Filed: Jun. 7, 1988

[51] Int. Cl.⁵ .............................................. B01D 35/027
[52] U.S. Cl. ..................................... 210/169; 210/248; 210/416.2; 119/5
[58] Field of Search ..................... 210/169, 416.2, 248; 119/3, 5, 2, 4

[56] References Cited

U.S. PATENT DOCUMENTS

| | | | |
|---|---|---|---|
| 3,747,762 | 7/1973 | White | 210/169 |
| 3,892,663 | 7/1975 | Wiedenmann | 210/169 |
| 3,983,843 | 10/1976 | Johnson | 210/169 |
| 4,602,996 | 7/1986 | Willinger | 210/169 |
| 4,622,148 | 11/1986 | Willinger | 210/169 |
| 4,800,025 | 1/1989 | Bibaeff | 210/703 |

Primary Examiner—Richard V. Fisher
Assistant Examiner—Wanda L. Millard
Attorney, Agent, or Firm—Spensley, Horn, Jubas & Lubitz

[57] ABSTRACT

An aquarium filter is disclosed that provides an overflow window for indicating a blocked filter cartridge. The filter cartridge extends across the full width of the filter box and includes an overflow weir, or lip. The overflow weir forms part of the filter structure and controls the flow of water when the filter cartridge is blocked. Since the filter cartridge extends across the width of the filter box, the size of the filter for a given flow rate is reduced. The filter provides the feature of overflow indication in a more compact and efficient structure than otherwise possible.

1 Claim, 2 Drawing Sheets

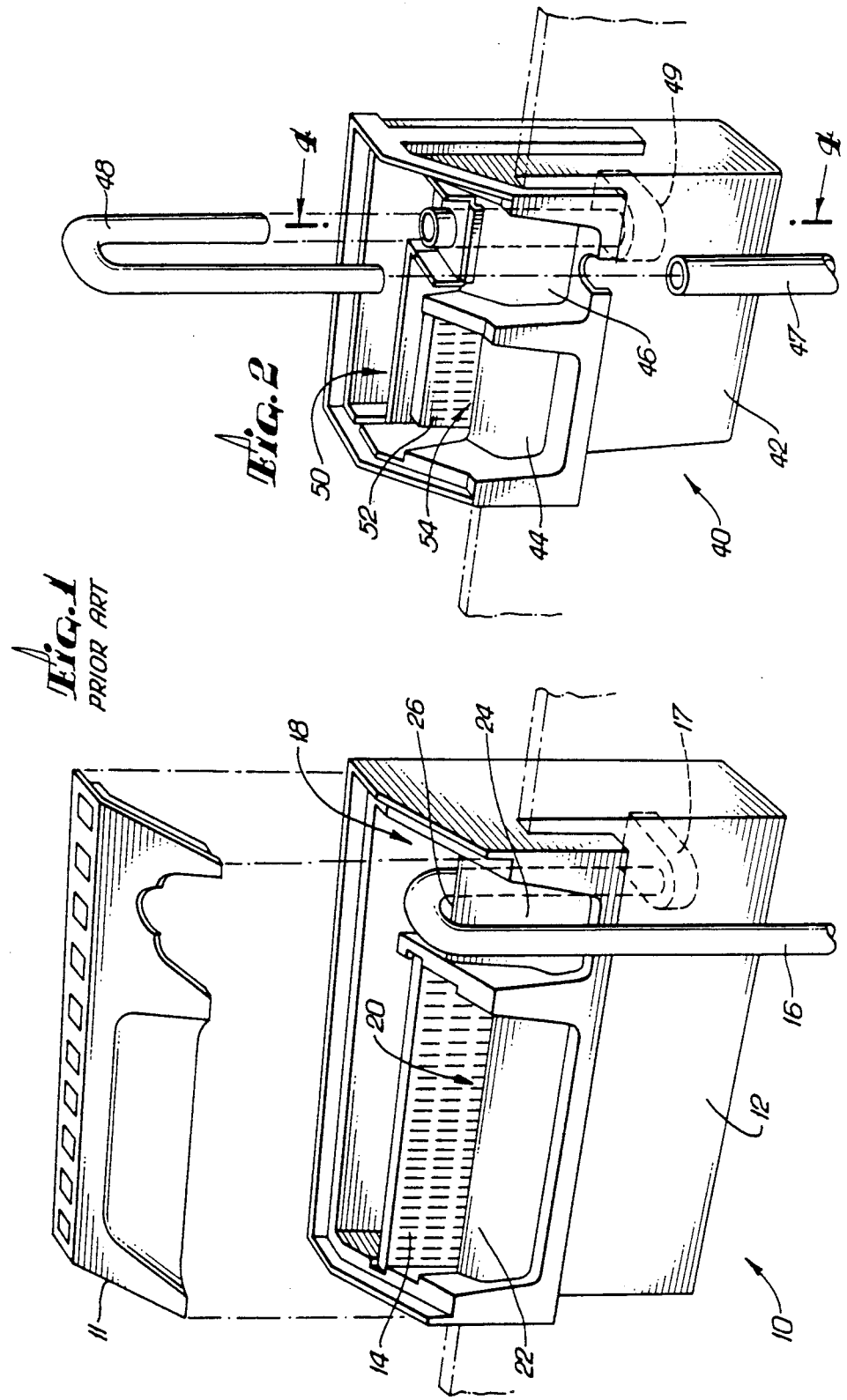

5,002,660

COMPACT AQUARIUM FILTER

BACKGROUND OF THE INVENTION

1. Field of the Invention

This invention relates to water filters and, more particularly, to filters for conditioning the water in fish tanks and aquariums.

2. Description of Related Art

In order to maintain the ecological balance of an aquarium, it is necessary to keep the water in the aquarium tank clean and to distribute a supply of oxygen throughout the aquarium water volume. For this purpose, an aquarium filter may be used that pumps water from the aquarium tank, passes the water through a filter medium, and returns the filtered water to the aquarium tank. The filter medium may be selected to remove fish waste products and other particulates, and to adsorb noxious dissolved gases and toxic chemicals from the aquarium water. In this way, a healthy environment for the fish may be maintained and the oxygen supply may be replenished.

A tank-type aquarium filter typically consists of a filter box that accepts a filter cartridge containing the filter medium. The filter draws in water from the aquarium tank through an intake tube by means of an impeller assembly, or pump, and discharges the water into an intake reservoir on the upstream side of the filter cartridge. The water passes from the intake reservoir through the filter cartridge, into a filter discharge reservoir, and over a discharge lip back into the aquarium tank. Many filter designs utilize a generally rectangular, planar filter cartridge. The internal volume of the filter box is roughly divided in half by the filter cartridge, defining the intake reservoir and discharge reservoir. This provides maximum space efficiency and very compact filter dimensions. The filter often includes a lid or cover to keep dust and dirt out of the intake reservoir and discharge reservoir.

As the aquarium water passes through the filter cartridge, the various particulates trapped by the cartridge and any growth thereon gradually slow or block the passage of water through the cartridge. When this happens, the water backs up on the upstream side of the filter cartridge in the intake reservoir. That is, the flow rate of water through the filter cartridge is less than the flow rate of water through the filter pump. As the water level in the intake reservoir rises, the water eventually flows over the top edge of the filter cartridge without being filtered, passing into the discharge reservoir, over the discharge lip, and back into the aquarium tank. As the filter becomes more and more plugged, eventually most of the return waterflow into the aquarium is unfiltered. In order to restore the normal flow of water and the filtration action, the filter cartridge must be changed. Thus, it is necessary for the aquarium user to periodically remove the filter lid to check the condition of the filter cartridge.

Another type of aquarium filter, shown in FIG. 1, incorporates a filter box in which the impeller assembly is removed from its position adjacent the filter cartridge and instead is placed off to one side of it. This allows an overflow window to be positioned next to the discharge lip. The top edge of the overflow window communicates with the intake reservoir. The filter box is constructed so that water ordinarily passes into the intake reservoir, through the filter cartridge, into the discharge reservoir, and over the discharge lip into the aquarium tank. As the filter cartridge becomes plugged, the aquarium water backs up in the intake reservoir. As this happens, the water flow over the discharge lip decreases and the water level in the intake reservoir becomes high enough that water flows over the top edge of the overflow window and into the aquarium tank. That is, the water flows directly from the intake reservoir, down the overflow window, and back into the tank.

In this way, glancing at the aquarium filter to check for water flowing from the overflow window makes the condition of the filter cartridge immediately apparent. Unlike the previously mentioned design, the filter with overflow window allows checking of filter cartridge condition without removing the filter lid. Unfortunately, this configuration does not make maximum use of space. As a result, the filter is larger and more bulky than the non-overflow window type. Thus, the overflow window type filter requires more space for the aquarium installation. A more compact design would be more attractive and could be used in more installations. The configuration without an overflow window is compact and efficient, but is less convenient for filter cartridge upkeep.

SUMMARY OF THE INVENTION

The present invention provides a compact filter that provides the overflow window feature of larger filters in a smaller, more efficient installation than otherwise possible. The filter cartridge of the present invention extends completely across the filter box and divides the internal volume of the filter box roughly in half, with the impeller assembly and intake tube placed adjacent to the front or back surface of the filter cartridge. As the filter cartridge becomes plugged and the unfiltered water backs up behind the filter cartridge, the water is carried from the intake reservoir, past the filter cartridge and discharge reservoir, directly onto the overflow window, where the water passes back into the aquarium tank. Thus, the overflow feature is retained in a more compact filter having a full-width filter cartridge.

In the preferred embodiment, the filter cartridge itself incorporates an overflow weir, or ledge, that forms part of the structure controlling the flow of water in the filter. The present invention thereby provides a filter with overflow indication in approximately the space of a filter with no overflow window. This allows the filter to be more compact, reducing the space requirements for the filter installation, while providing the convenience of automatic indication of a blocked filter cartridge. The filter cartridge itself thus incorporates a structure for carrying the flow of water within the filter, rather than acting simply as a dam or levee.

Preferably, the impeller housing is located in the discharge reservoir and pumps the tank water around the filter cartridge to empty into the intake reservoir. The intake tube communicates with the impeller housing. This allows the filter cartridge to be changed without removing the intake tube and without interrupting the flow of water through the filter. A notch may be provided in the edge of the filter cartridge to accommodate the portion of the impeller housing that communicates with the intake reservoir. Alternatively, the impeller housing and discharge end of the intake tube may be located in the intake reservoir.

The novel features which are believed to be characteristic of the invention, together with further objectives and advantages thereof, will be better understood from the following detailed description considered in connection with the accompanying drawings. It should be expressly understood, however, that the drawings are for purposes of illustration and description only and are not intended as a definition of the limits of the invention. The scope of the invention is best determined by reference to the appended claims.

BRIEF DESCRIPTION OF THE DRAWINGS

FIG. 1 shows a perspective view of a prior art aquarium filter with overflow window;

FIG. 2 shows a perspective view of the present invention;

DETAILED DESCRIPTION OF THE DRAWINGS

Figure 3:
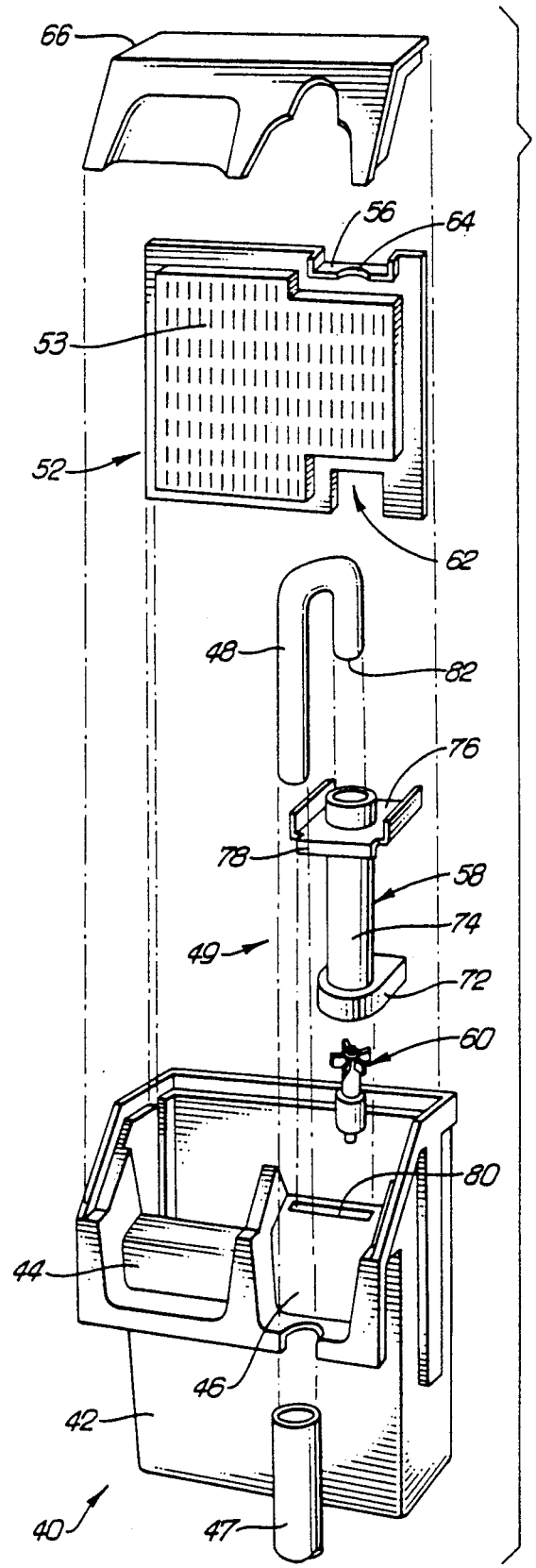
FIG. 3 shows an exploded perspective view of the present invention illustrating a preferred embodiment of the filter cartridge.

FIG. 1 shows a perspective view of a prior art aquarium filter 10 with its cover 11 removed. The filter 10 includes a filter box 12 that accepts a filter cartridge 14. Ordinarily, the cover 11 is placed over the top of the filter box to keep contaminants out of the reservoirs and provide a more attractive filter installation. Water from the aquarium tank is drawn through an intake tube 16 by an impeller assembly 17 that communicates with the intake tube and is located on the floor of the filter box. The filter cartridge 14 divides the filter box into an intake reservoir 18 and a discharge reservoir 20. The water drawn from the intake tube 16 is pumped into the intake reservoir 18 by the impeller assembly. The water then flows through the filter cartridge 14 and into the discharge reservoir 20. Once the water level in the discharge reservoir reaches a sufficient height, the water spills over a discharge lip 22 and back into the aquarium tank.

Alongside the discharge lip 22 and under the intake tube 16 is an overflow window 24, or lip. When the filter cartridge 14 becomes clogged, the flow rate of water that can be accommodated by the filter becomes less than the flow rate through the impeller assembly and into the intake reservoir 18. When this happens, water starts backing up in the intake reservoir. The water level in the intake reservoir 18 becomes higher than the level of the discharge lip 22. Eventually, the water level in the intake reservoir becomes high enough to steadily flow over the top edge 26 of the overflow window 24. This indicates a blocked filter and cues the user to clean or replace the filter cartridge.

FIG. 2 shows a perspective view of a filter 40 incorporating a preferred embodiment of the present invention. The filter box 42 includes a discharge lip 44 and an overflow window 46, or lip. An intake tube 48 routes water from the aquarium tank into an impeller assembly 49. The impeller assembly includes a conduit that routes the water under the filter cartridge and into an intake reservoir 50. From the intake reservoir, the water flows through the filter cartridge 52 into a discharge reservoir 54 and over the discharge lip 44 back into the aquarium tank. An intake tube extension 47 may be attached to the intake tube to extend down into the aquarium tank.

Details of the filter construction are illustrated in FIG. 3, which shows an exploded perspective view of the filter. As FIG. 2 and FIG. 3 show, the filter cartridge 52 extends completely across the filter box 42, dividing the inside volume of the filter box into the intake reservoir 50 and discharge reservoir 54. The filter cartridge includes a mesh filtration media 53 that provides a mechanical filtering action. The top edge of the filter cartridge includes an overflow weir 56, or ledge, that extends outwardly from the surface of the filter cartridge.

When the cartridge is in place in the filter box, the overflow weir 56 extends out over the discharge reservoir 54 and toward the top edge of the overflow window 46. Thus, when the filter is clogged up and water begins to back up in the intake reservoir 50, the water level in the intake reservoir rises to the level of the overflow weir 56. When this happens, the water flows onto the overflow weir and is carried over the discharge reservoir and down the overflow window 46 back into the aquarium tank. Thus, the overflow weir acts as a channel or conduit for the water. Water flowing down the overflow window indicates a clogged filter cartridge. In this way, the filter 40 retains the feature of overflow indication in a more compact and attractive package compared to previous designs.

Figure 4:
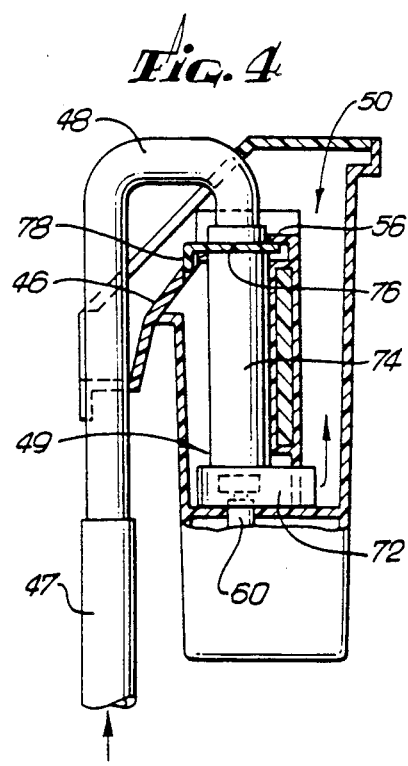
FIG. 4 shows a side sectional view taken along the line in FIG. 2.

In the illustrated configuration, the filter cartridge 52 may be changed without disturbing the intake tube 48 and therefore this embodiment is preferred. FIG. 4 shows that the impeller assembly 49 mates with the intake tube 48 in the discharge reservoir 54 downstream of the filter cartridge. The impeller assembly includes an impeller housing 58 and a rotating impeller 60. The impeller housing has an impeller output conduit 72 at its bottom end and an inlet tube guide 74 extending upwardly.

The inlet tube guide 74 includes an overflow ramp 76 at its upper end. A portion of the inlet tube guide 74 extends above the ramp. The overflow ramp 76 helps to bridge any distance between the overflow weir 56 and the overflow window 46. A different ramp, or additional adapter piece, may be necessary depending on the overflow weir and the position of the cartridge in the filter box. Such pieces will occur to those skilled in the art. In the preferred embodiment, the ramp 76 includes a positioning extension 78 that is received into a positioning slot 80 located on the overflow window 46 of the filter box.

When assembled, the outlet end 82 of the intake tube fits down into the inlet tube guide 74 of the impeller housing, which rests on the floor of the filter box. The level of the ramp 76 is approximately the same as the top edge of the overflow window 46. When the impeller rotates, water is pumped down the intake tube into the impeller housing 58 and out the output conduit 72. When the filter cartridge 52 is inserted into the filter box 42, the output conduit 72 of the impeller housing is received into an underflow gate 62 in the cartridge. That is, the filter cartridge fits down onto the impeller housing. The output conduit 72 thus communicates with the intake reservoir 50. The overflow weir 56 preferably rests on the top surface of the ramp 76 and a notch 64 may be included in the forward edge of the weir to receive a circumferential portion of the inlet tube guide. Thus, the filter cartridge 52 may be changed without disturbing the intake tube or impeller housing.

A filter lid 66 fits down over the filter box, covering the intake reservoir and discharge reservoir.

Figure 5:
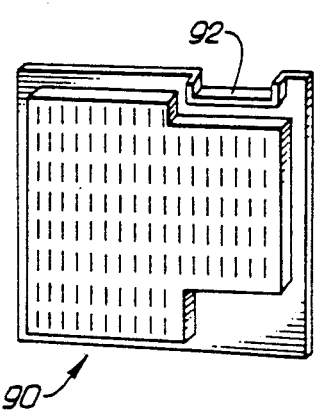
FIG. 5 is a perspective view of a second embodiment of the filter cartridge of the present invention.

FIG. 5 shows an alternative embodiment of a filter cartridge in accordance with the present invention in which the filter cartridge 90 includes an overflow weir 92 but lacks an underflow gate. This filter cartridge could be used, for example, where the impeller housing is located in the intake reservoir and there is no need for the impeller output conduit to pass underneath the filter cartridge.

Other modifications are possible without departing from the spirit of the invention and will occur to those skilled in the art. For example, the overflow weir may comprise an opening, or porthole, in the filter cartridge, with a ledge extending outwardly from the porthole.

Although the invention has been described with respect to a filter cartridge having an overflow weir, it should be understood that the invention is not to be so limited. In one embodiment, the invention includes a full-width filter cartridge with a straight top edge, used in conjunction with a filter box having an overflow lip, or window, and including an overflow ramp that bridges the distance between the top edge of the filter cartridge and the overflow window. Thus, when the filter cartridge becomes plugged, water not passing through the cartridge is channeled from the intake reservoir, over the cartridge, and onto the discharge window.

What is claimed is:

1. A filter for treating aquarium water, comprising a filter box having a front wall with an overflow lip and an overflow window, a rear wall, a first side wall, and a second side wall;

a filter cartridge extending from the first side wall to the second side wall to divide the filter box into an intake water reservoir and a discharge reservoir;

an inlet tube for discharging aquarium water into the intake water reservoir of the filter box;

an overflow ramp extending from the intake water reservoir, over the filter cartridge and forward to the overflow window so that untreated water flows over the ramp when the filter cartridge becomes clogged to indicate that the filter has become clogged and the ramp further defining a passage for the inlet tube.

* * * * *